United States Patent Office 3,311,741
Patented Mar. 28, 1967

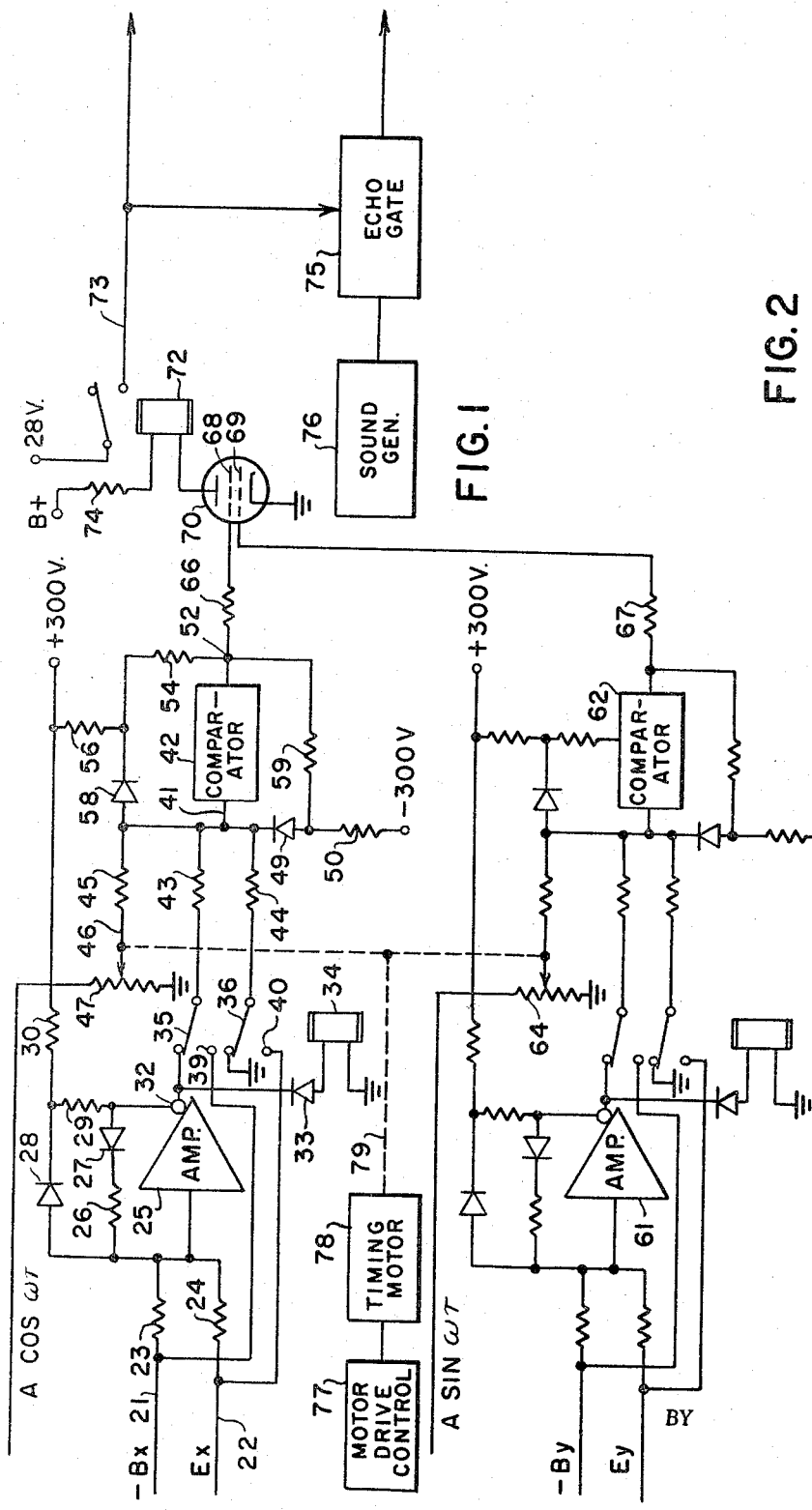
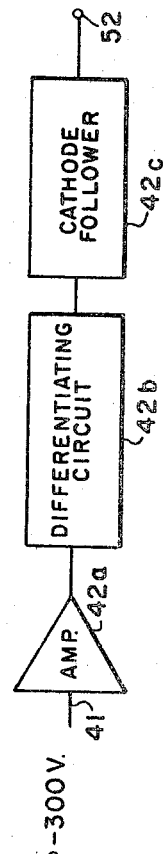

3,311,741
CIRCUIT FOR COMPUTING SIMULATED RANGE
Robert R. Fontaine, Riverdale, and William H. Sturdevant, Hyattsville, Md., assignors, by mesne assignments, to General Precision, Inc., Binghamton, N.Y., a corporation of Delaware
Filed Mar. 12, 1963, Ser. No. 264,529
5 Claims. (Cl. 235—184)

The invention relates to an analog computation technique particularly for simulating active echo ranging from voltages representing the X and Y positions of two for obtaining the range between the devices as a time interval at the end of which a desired response is produced.

The invention is useful in an anti-submarine warfare simulator, for example, wherein the above-mentioned voltage may represent the X and Y positions of underwater explosion devices, sonobuoys, underwater targets, or the ocean bottom. The response at the end of the range determined time interval may be used to initiate sound generation devices which are either heard or recorded, or the response in some cases may be used for further simulated range computing.

It is an object of the invention to compute short as well as long ranges accurately using D.C. analog voltages representing coordinates of positions, without the usual ratheh complex coordinate transformer devices.

Another object of the invention is to compute directly in terms of time the range between two devices whose coordinates are represented by D.C. voltages, without first obtaining a voltage analog of the time, or first computing the bearing of one of the devices relative to the other.

A feature of the invention is that the simulated range is computed electronically directly from the voltage analogs of two positions.

Other objects and advantages of the invention will be understood from the following description and accompanying drawing thereof, wherein FIG. 1 is a schematic diagram of the invention, and
FIG. 2 is a block diagram of the comparator.

Referring to the drawing D.C. voltages $B_x$ and $B_y$ represent the X and Y positions of one device, such as a sonobuoy, and $E_x$ and $E_y$ are D.C. voltages representing the coordinates of another device, such as a depth charge. These voltages may also represent the coordinates of an underwater target, the ocean bottom, etc. The position voltages are fed over lines 21 and 22 and through resistors 23 and 24 to the input of D.C. summing amplifier 25, which includes a negative feedback network having elements 26–29. Plate voltage is supplied to the amplifier through resistor 30. Output terminal 32 of the amplifier is connected through rectifier 33 to relay 34 having movable contacts 35 and 36. Terminal 32 is returned to a source of negative potential through contact 35, as will be described later. If the sum of the voltages at the input of amplifier 25 is negative, the output voltage at terminal 32 rises to a positive value proportional to the absolute value of input voltages $E_x$-$B_x$, since resistors 23 and 24 are made equal. Amplifier 25 is designed so that if the sum of the input voltage to amplifier 25 is positive, the amplifier proceeds rapidly toward saturation and terminal 32 assumes a given potiential of say $-10$ volts. When this condition occurs a current flows through relay winding 34 and rectifier 33 to terminal 32 and causes relay 34 to operate. Contacts 35 and 36 then close against contacts 39 and 40 and thus connect to conductors 21 and 22. The sum of the voltages on contacts 35 and 36 is again a positive value proportional to the sum of the input voltages $E_x$-$B_x$.

The voltage between contacts 35 and 36 is then applied to the input 41 of a comparator 42 through resistors 43 and 44. An A.C. voltage is also applied to the input of comparator 42 through resistor 45 from potentiometer tap 46. Voltage A cos $wt$ is impressed across potentiometer 47 and tap 46 is moved by a timing motor, as explained in more detail later. The input 41 of comparator 42 is returned to $-300$ volts through rectifier 49 and resistor 50. Output terminal 52 is connected to the plate voltage supply through resistors 54 and 56 and rectifier 58. Terminal 52 is also returned to the $-300$ volt terminal through resistors 59 and 50. Comparator 42 includes essentially a summing amplifier 42a, a differentiating circuit 42b and preferably an output stage such as a cathode follower 42c as shown in FIG. 2.

Amplifier 25 is preferably designed as an operational amplifier with a high gain and with a large negative feedback factor provided by elements 26–29. A negative resultant voltage on the input terminal of amplifier 25 produces a positive voltage on terminal 32 and this voltage is conveyed to the input of amplifier 42a. If the resultant of the input voltage supplied to amplifier 25 has a positive value, terminal 32 assumes a negative value and relay 34 operates to switch contacts 35 and 36 to input conductors 21 and 22. Thus the output of amplifier 25 to comparator 42 is always a positive voltage X corresponding to the absolute value of the sum of $E_x$ and $-B_x$, which as already noted, represent the X coordinates of the positions between which the range is being determined. If the A.C. voltage is less than the D.C. voltage, comparator 42 provides no output. If the A.C. peak voltage is greater than the D.C. voltage at input 41, then comparator 42 will provide a positive pulse each time the sum of the A.C. and D.C. voltages cross a zero value.

The circuit associated with amplifier 61 and comparator 62 is the same as that associated with amplifier 25 and comparator 42 just described. The input voltages $-B_y$ and $E_y$, however, represent the Y coordinates of the devices between which the range is being determined, and the voltage impressed on potentiometer 64 is A sin $wt$. The outputs of comparators 42 and 62 are fed through resistors 66 and 67 to grids 68 and 69 of a coincidence circuit tube 70 having a grounded cathode. The anode of tube 70 is connected to a relay 72 and through resistor 74 to a source of anode voltage. When positive voltage outputs are obtained from comparators 42 and 62, the coincidence circuit provided by tube 70 energizes relay 72 and closes voltage circuit 73. The latter circuit may be used to trigger any desired device, such as a gate circuit 75 for a sound generator 76 to simulate the reception of a depth charge explosion at a sonobuoy. The taps of potentiometers 47 and 64 are moved upwardly from the zero voltage position at a uniform rate by timing motor 78, which is started, or preferably clutched to drive connections 79 at, say, the time of the depth charge explosion by a drive controller 77. Clutching is preferred since it provides more uniform driving speed than that of the motor while it is accelerating to its normal speed. The drive control, when triggered by a simulated depth charge explosion, remains operative for a period required approximately to enable the wipers to traverse potentiometers 47 and 64, whereupon the wipers of the potentiometers are adjusted to their initial zero positions by any suitable means, such as restoring springs.

The amplitudes of the sine and cosine voltage waves at the inputs of comparators 42 and 62 are given by A$t$ sin $wt$ and A$t$ cos $wt$. At the time T of coincidence, the X and Y components of the range are given by $X = AT \cos wt$
$Y = AT \sin wt$ and the range is $$\sqrt{X^2+Y^2}=aT$$

It is apparent that T is the time of travel over the range and A represents the velocity of propagation of the sound wave from the explosion to the sonobuoy. Thus the solution of the above simultaneous equations by the coincidence circuit of tube 70 yields the time of travel T of the wave.

The invention has been described particularly with reference to establishing the travel time from an explosion to a sonobuoy. The circuit is obviously applicable to the measurement of the travel time from the explosion to a target. The $B_x$ and $B_y$ voltages may vary to simulate the movement of the target. The ocean bottom echo range may be computed by providing a third D.C. amplifier in the channel. The simultaneous solution of the above given X and Y equations for the travel time from the explosion to the sonobuoy is first obtained using two amplifiers. When coincidence is obtained to provide a measure of the direct return time, a D.C. range signal (which may be obtained from a D.C. potentiometer driven by the timing motor until coincidence) is stored in the third amplifier. Since the bottom return is always later than the direct return, the same amplifiers used to compute the direct return may be used to compute the bottom return. Therefore, the stored D.C. range and twice bottom depth are inserted as the new X and Y voltages at the inputs of the comparators for a second simultaneous solution of the above trigonometric equations to provide the bottom return measurement.

Other applications and variations of the invention will be evident to those skilled in the art. The invention, therefore, is not to be construed as limited except as defined by the claims.

What is claimed is:

1. A computing circuit for determining a time interval corresponding to the simulated range between two devices, comprising
    (a) means for supplying first and second voltages having magnitudes representing one coordinate of said two devices,
    (b) means for obtaining a third voltage proportional to the absolute value of the difference between said first and second voltages,
    (c) means for supplying fourth and fifth voltages having magnitudes representing another coordinate of said two devices,
    (d) means for obtaining a sixth voltage proportional to the absolute value of the difference between said fourth and fifth voltages,
    (e) means for supplying two alternating voltages in phase quadrature having amplitudes increasing uniformly from a zero valve at a given instant,
    (f) and means for producing an output signal when one of said alternating voltages equals said third voltage and the other alternating voltage simultaneously equals the sixth voltage.

2. Apparatus according to claim 1, wherein said last mentioned means includes
    (a) a comparator circuit for comparing one of said alternating voltages with third voltage,
    (b) a comparator circuit for comparing the other alternating voltage with the sixth voltage,
    (c) each of said comparator circuits including a summing amplifier and a differentiating circuit connected thereto,
    (d) and a coincidence circuit connected to the outputs of said comparator circuits.

3. Apparatus according to claim 2, wherein said means for supplying the alternating voltages includes
    (a) a pair of potentiometers having wipers,
    (b) means for impressing one of the alternating voltages across each potentiometer,
    (c) a timing motor coupled to the potentiometer wipers for driving them in unison,
    (d) and means for initiating driving of said wipers by said motor.

4. A computing circuit for simulating the arrival of a wave from an underwater explosion device at another device, comprising
    (a) means for supplying first and second direct current voltages having polarities and magnitudes representing one coordinate of said two devices,
    (b) means for obtaining at third voltage proportional to the absolute value of the difference between said first and second voltages,
    (c) means for supplying fourth and fifth direct current voltages having polarities and magnitudes representing another coordinate of said two devices,
    (d) means for obtaining a sixth voltage proportional to the absolute value of the difference between said fourth and fifth voltages,
    (e) means for supplying two alternating voltages in phase quadrature having amplitudes increasing uniformly from a zero value at a given instant,
    (f) and means for producing an output signal when one of said alternating voltages equals said third voltage and the other alternating voltage simultaneously equals the sixth voltage.

5. Apparatus according to claim 4 including an audio frequency generator and means for controlling the output of said generator in response to said output signal.

References Cited by the Examiner

UNITED STATES PATENTS

| | | | |
|---|---|---|---|
| 2,938,278 | 5/1960 | Brown | 35—10.4 |
| 3,115,535 | 12/1963 | Pastoriza et al. | 35—10.4 |
| 3,149,195 | 9/1964 | Cutler | 35—10.2 X |
| 3,169,162 | 2/1965 | Kling | 35—10.4 |

MALCOLM A. MORRISON, *Primary Examiner.*

ROBERT C. BAILEY, I. KESCHNER, *Examiners.*